June 10, 1969 P. W. WOO 3,449,718

ERROR CORRECTION BY ASSUMPTION OF ERRONEOUS BIT POSITION

Filed June 10, 1965

INVENTOR
PAUL W. WOO

BY Bernard M. Goldman
ATTORNEY

United States Patent Office 3,449,718
Patented June 10, 1969

3,449,718

ERROR CORRECTION BY ASSUMPTION OF ERRONEOUS BIT POSITION

Paul W. Woo, Poughkeepsie, N.Y., assignor to International Business Machines Corporation, Armonk, N.Y., a corporation of New York Filed June 10, 1965, Ser. No. 462,933
Int. Cl. G08b *29/00;* G06f *11/00;* G11b *5/00*
U.S. Cl. 340—146.1 12 Claims

ABSTRACT OF THE DISCLOSURE

An error correction system for a data block in which each byte is error checked, and all bits at each single byte position are error checked. Any error is assumed by inverting a bit at an arbitrarily select bit position of each byte having an error check. The data bits after such possible inversion are provided to the block redundancy check for all bit positions. Whenever no block error is indicated by the block redundancy check after a block has been received with a bit position error assumption, the block has been received correctly. If the block redundancy summation detects an error, a retransmission of the block is signaled and another bit position is assumed as the erroneous bit position during that retransmission for an attempted correction.

This invention relates to error correction by examining a selected bit position in each byte in a received block of data having both byte and block redundancy. The selected bit position involves an assumption that it is the bit position in error if a byte redundancy error is indicated. The selected bit is inverted for correction if an error is indicated. Data block redundancy is then used after any data block transfer to determine if the byte bit-position selection is correct. Hence, bit selection is an assumption of error bit location in erroneous bytes. If the assumption is incorrect, another byte bit-position selection is made, and a retransmission of the block and its redundancies occurs. The assumption is changed for each retransmission until no block error occurs, or until all assumable bit-positions have been examined.

A block of data is defined herein as comprising a plurality of bytes of data, and a byte is defined as a group of bits having self-contained redundancy. A bit may have a value of either zero or one. Block redundancy applies to another dimension of data bits than is found in a byte. This block redundancy may apply to all data bits in one channel of a block, or to all data bits within the block and can include redundancy bits.

Commonly used byte redundancy herein includes odd or even vertical parity, or a code having $m$ number of bits of the same value out of $n$ bit positions in each code character. Magnetic tape systems presently marketed in the U.S.A. include block redundancy checking by the longitudinal redundancy check character (LRCC). Other known block redundancies are in a diagonal redundancy check character (DRCC) such as found in U.S. Patents 3,008,004 (Young) and 3,008,005 (Barry et al.), cyclic redundancy check character (CRCC) disclosed in U.S. patent application Ser. No. 357,368, filed Apr. 4, 1964, by D. R. Brown and the same assignee, Hamming code check bits (HCCB) based on an entire block or respective channels of an entire block of the type described in U.S. Patent No. Re. 23,601 (Hamming et al.).

This invention may require a retransmission of data block with its byte and block redundancies after any transmission having a block error indication even after all available bit position assumptions have been made. An assumption is made prior to each transmission of the block that if any error occurs, it will occur in the same bit position in one or more bytes comprising the block. During a block transmission, any bit in the assumed position is inverted if an error is indicated by its byte redundancy check. Hence, no inversion occurs to any bit in the assumed position if its byte does not have byte redundancy error indication.

The block redundancy check is made for the bits in the block to which the block redundancy pertains, and the block redundancy check is made *after* inversion is provided to any assumed erroneous bit in a byte having a byte redundancy error. If the block redundancy error indication remains after any bit position assumption, the assumption is shown to be incorrect, and another bit position in each byte is assumed for the next block transmission.

After any block retransmission in which no error is indicated by the block redundancy check, correct data has been obtained from any utilized bit inversion.

However, if no error is found during the initial block transmission, there will be no inversion of any bit, no block error is indicated, and no retransmission of the block is required.

After every bit position in each byte has been assumed to have the error, and a block redundancy error indication remains, an uncorrected error condition is indicated. This, nevertheless, may be followed by a repeat assumption operation cycle repeating the assumption for each available bit position, since error conditions may have changed during the second repeat cycle to then permit error correction.

This invention may be applied to the transmission of data over any medium, such as telephone lines, radio waves; and it includes transmission from any faulty storage medium, such as magnetic tape, core memory, or thin film memory. For example, with a magnetic tape drive transmitter connected through a tape control receiver to a computer, conventional types of byte redundancy check circuits and block redundancy check circuits found in tape controls may be utilized as part of this invention. Additional means required by this invention in the tape control includes (1) means for assuming an erroneous bit position in a byte (this generally corresponds to assuming an erroneous track in the tape data block), (2) means for inverting any bit from the assumed track in response to a signal from the byte redundancy check circuit (this generally is the vertical redundancy check circuit), and (3) connecting the block redundancy check circuit (which generally is the longitudinal redundancy check circuit, or a cyclic redundancy check circuit) *after* the inversion means to provide an error signal to the computer after any transmission of the block to indicate if the assumption is correct. If the assumption is not correct, the computer includes an error-routine subprogram that responds to the error signal by causing the tape drive to retransmit the information from the same tape data block. This may be done by backspacing the tape and rereading the block in the same direction for each retransmission, or alternatively it may be done by reading the tape forward, then backward, etc., for sequential retransmission of the data block in those tape drives having read backward as well as read forward capability. Once an erroneous block has been read from tape into a computer memory, the second and any following retransmission need not be made from the tape, but can be made from the computer memory through the error correction circuits back to the computer memory, as long as the same byte and block redundancy is retained in the computer memory.

The foregoing and other objects, features and advantages of the invention will be apparent from the following more particular description of the preferred embodiments of the invention as illustrated in the accompanying drawings.

Figures 1, 2, 3:
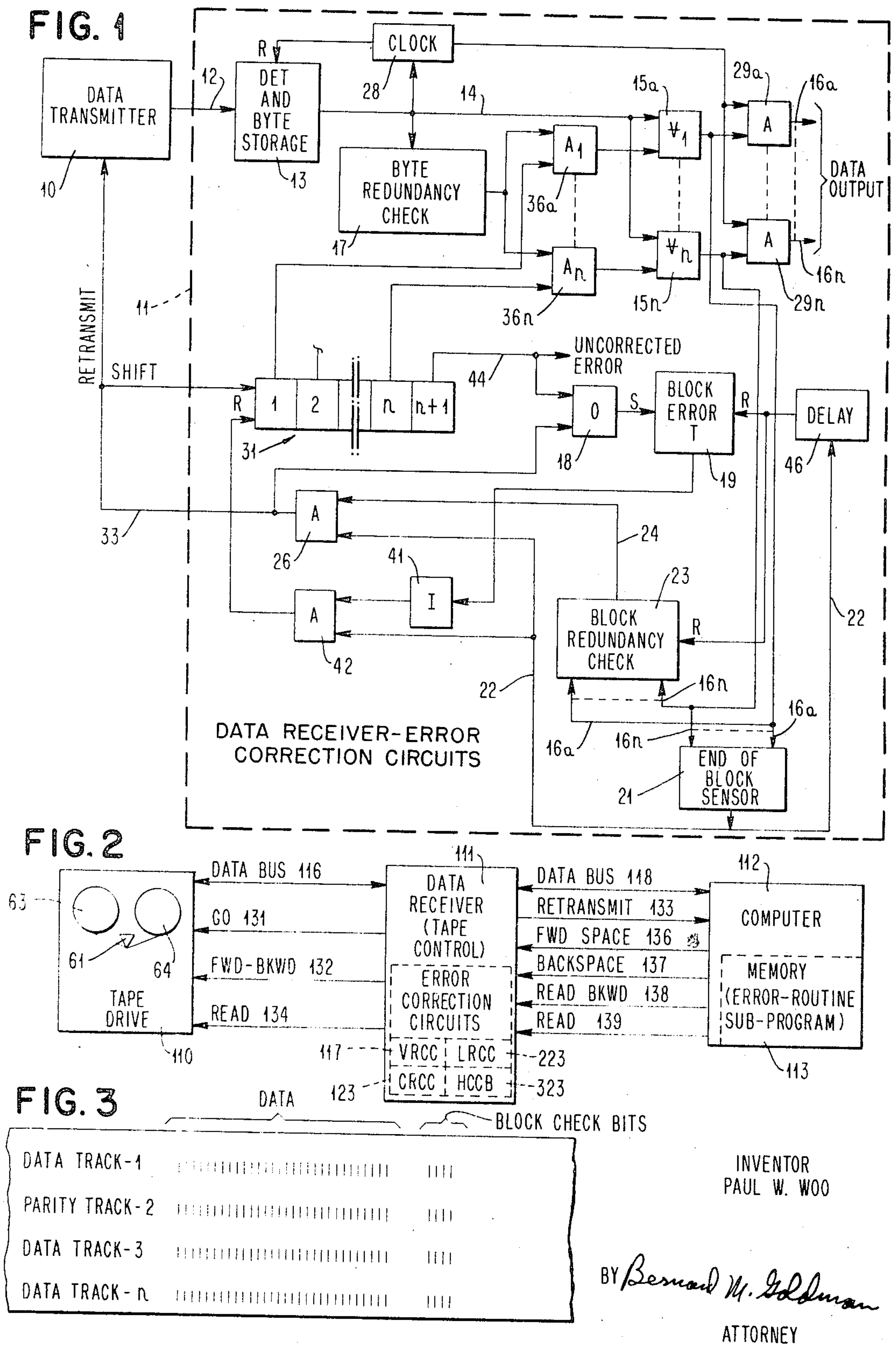
FIGURE 1 shows a detailed embodiment of this invention for use with a data transmission network.
FIGURE 2 shows a computer tape drive environment for this invention.
FIGURE 3 illustrates a block of data an magnetic tape having both byte redundancy and block redundancy check bits.

The embodiment, shown in FIGURE 1, includes a data transmitter 10 which may be a transmitter of any type such as a data communication transmitter or a tape drive. The data is transmitted in blocks of bytes; there may be any number of bytes in a block. In this embodiment, byte redundancy check bits are provided with each byte, and a set of block check bits are provided either before, after or within the data block for the entire data and check bits of the block.

Data is transmitted over a bus 12 to a detector and byte storage means 13, which may be of conventional type. The received bits are detected and assembled within byte storage 13. An output bus 14 transfers the bits of each byte to respective output transmission lines 16*a* . . . *n* through respective Exclusive-OR circuits 15*a* . . . *n* and sampling gates 29*a* . . . *n*. A clock 28 and a byte redundancy check circuit 17 are connected to the output of byte storage 13. Byte check circuit 17 provides a byte error indicating output to each of a plurality of AND gates 36*a* . . . *n*. Gates 36*a* . . . *n* are conditioned by the check circuit output only if a byte redundancy error is detected by the check circuit 17.

Only one of gates 36*a* . . . *n* are enabled at any one time as a function of one of the outputs from a shift register 31. Each Exclusive-OR circuit 15*a* . . . *n* provides a one output if its two inputs are different (one is "zero" and the other is "one"); and it provides a zero output if its two inputs are the same (both "zeros" or both "ones").

Clock 28 is actuated once per byte received by storage 13, and it provides an output that resets storage 13 after each byte is outputed by gates 29*a* . . . *n*. The output of clock 28 activates the plurality of AND gates 29*a* . . . *n*, which sample the outputs of the Exclusive-OR circuits 15*a* . . . *n* to ultimately provide the correct data output.

Shift register 31 is an "assumption circuit." The up output from one of its stages 1 . . . *n* identifies one assumed bit-error position in every erroneous byte in the block during a block transmission. Register 31 is initially reset prior to operation to activate the output from its first stage, in order to initially make the first bit-position assumption. The shift register positions 1 . . . *n* are equal in number to the number of bit positions in a byte. Nevertheless, any bit-position order in a byte may be assigned to shift register positions 1 . . . *n*. For example, register position 1 may correspond to one extreme bit-position in a byte, register position 2 may correspond to the opposite bit-position in the byte, etc. A preferable assignment order is to assign the first register position to the byte bit-position having the highest statistical likelihood of being in error. Then the second register position is assigned to the byte bit position having the second highest statistical likelihood of error, and so on, with the penultimate register position *n* being assigned to the bit position in each byte having the least likelihood of error.

A last register position, $n+1$, is provided to indicate (1) that errors existed in more than one bit position during an error-correction cycle and (2) that an error somewhere in the block still remains uncorrected. Thus, the last register output 44 indicates an uncorrected error. This output can be used to signal a second error correction cycle, since error-causing conditions may have changed since the first cycle to permit error correction during the second cycle.

The end of transmission of a data block is indicated by an end-of-block sensor 21, which may be of any conventional type. For example, end-of-block sensor 21 may sense a special character provided at the end of each block, and thereby it may be a special character decoder. On the other hand, it may sense the occurrence of the inter-record gap following a data block by sensing the termination of the intrablock character spacing period; and in this case it may be the conventional hold-over single-shot or a delay counter which times out a period in excess of the maximum intrablock character spacing period. Another type of conventional end-of-block sensor is a special channel signal indicating end-of-block, such as derived from tape having a block marker track.

A block redundancy check circuit 23 is provided with inputs from lines 16*a* . . . *n*. Block redundancy check circuit 23 may be a cyclic redundancy check register (CRCR) of the type described in U.S.A. patent application Ser. No. 357,368, filed Apr. 4, 1964, assigned to the same assignee as the subject specification. Briefly, the CRCR is a shift register having end around feedback and intermediate feedback. The bits of each byte are set into its stages whenever two inputs are received by a shift register stage, they are added modulo-two. The register is shifted one position after each byte is received.

Alternatively, block redundancy check circuit 23 may be a longitudinal redundancy check circuit (LRCC) of the type described in U.S.A. patent application Ser. No. 246,707, filed Dec. 24, 1962, and now Patent No. 3,273,-120, issued Sept. 13, 1966, assigned to the same assignee as this specification.

An output 24 from redundancy check circuit 23 provides a reliable indication of the existence of an error in a block *only after* the entire block and its block redundancy bits have been received, as indicated by the output of end-of-block sensor 21. For this purpose, an AND gate 26 is provided which receives the outputs from both block check circuit 23 and end-of-block sensor 21. Hence, AND gate 26 provides an output on lead 33 only if a block error indication exists *after* the transmission of a data block. Lead 33 provides an error indicating output signal to the data transmitter 10 to request a retransmit of the block, and it also provides a signal to "assumption" shift register 31 to shift to the next assumed byte bit position.

A block error trigger 19 is set by an output from gate 26 which passes through an OR circuit 18.

Trigger 19 and check circuit 23 are reset prior to the next retransmission of the block in response to a signal that is delayed via delay means 46 before being applied to the reset inputs of check circuit 23 and trigger 19. Delay 46 may be the delay derived from computer control after the computer has digested the information provided to it from block error trigger 19. The output from gate 26 in FIGURE 1 will be active until circuit 23 is reset. Shift register 31 and all other storage circuits in receiver 11 are initially reset by conventional initial reset means not shown.

Also, shift register 31 is reset whenever a data block is received without any block redundancy error indication. This no-error indication is provided to the reset input by an AND gate 42. Gate 42 is conditioned by the end-of-block output signal from sensor 21. Also, gate 42 is conditioned by a no-error indication from block error trigger 19, such as provided from an inverter 41 which provides a complementary up output when the error trigger output is down indicating no error.

To begin operation of the embodiment in FIGURE 1, each of its trigger circuits is initially reset by conventional means not part of this invention. Then a block of data is transmitted by data transmitter 10 to receiver 11, including both byte redundancy and block redundancy. The manner and form of transmission are also not part of this invention. The bits in each byte may be transmitted in series or parallel or a combination of a series-parallel; and in any case are assembled on a byte basis in storage device 13 after detection. However, in this embodiment, the stored bits of each byte, including byte redundancy such as a parity bit, are applied simultaneously to byte redundancy check circuit 17 to a clock 28, and to Exclusive-OR gates 15_a_ . . . _n_. AND gates 36_a_ . . . _n_ are only conditioned by an error output from check circuit 17. A no-error indication by check circuit 17 is indicated by an output that does not condition any of AND gates 36_a_ . . . _n_; and none of AND gates 36_a_ . . . _n_ provides any output to any Exclusive-OR circuit 15_a_ . . . _n_. In this no-error case, every bit in the byte is transferred through Exclusive-OR circuit 15_a_ . . . _n_ without change in value.

Clock 28 indicates when the operation is completed for a byte and that circuit 17 and the gates 36_a_ . . . _n_ and circuits 15_a_ . . . _n_ have had time to operate. Then clock 28 provides an output to gates 29_a_ . . . _n_ to sample and transfer the outputs of Exclusive-OR circuits to output lines 16_a_ . . . _n_. Shortly thereafter, clock 28 provides an output that resets byte storage circuit 13. The receiver is then prepared to receive the next byte in the block.

If any byte has an error indicated by check circuit 17, all of gates 36_a_ . . . _n_ are conditioned for the remainder of that byte period. But only one of gates 36_a_ . . . _n_ is actually enabled by the single up output from shift register position 1 during the first transmission of the block, because register 31 was initially reset to examine position 1 in the byte for error location during the first block transmission. When enabled by an error indication from circuit 17 during a byte, the up output of gate 36_a_ causes Exclusive-OR 15_a_ to invert its received data bit in byte position 1. No other Exclusive-OR circuit in the group 15_a_ . . . _n_ can invert its received bit, because none of the other Exclusive-OR circuits receives an enabled output from any other AND gate in the group 36_a_ . . . _n_. If at the end of the first data transmission, no byte redundancy error is found, there will be no bit inversion; and if no block error is indicated, no retransmit signal is provided from gate 26. Hence, there will be no second transmission of the data block.

However, if an error does occur with one or more bytes in the block, in assumed position 1 of these erroneous bytes, each of the bits is inverted whether or not it is in fact erroneous. If these assumed bits are in fact erroneous, they will have been corrected by the inversion; and a no-error indication by block-redundancy check circuit 23 will indicate that the errors have been properly corrected.

On the other hand, if these assumed bits were not erroneous and were improperly inverted, this is indicated by an error output signal from block-redundancy check circuit 23. In this case, a block error signal from gate 26 indicates (1) that the bit-position assumption was incorrect, (2) that another bit-position assumption should be made as the error position, and (3) that a retransmission of the block should be made for the next assumption. Thus register 31 is shifted to its second position by an output from gate 26 and then block redundancy check 23 and error trigger 19 are reset.

During the next (second) transmission, the second AND gate from the group 36_a_ . . . _n_ is conditioned by activation of the second output from shift register 31. Then an inversion is provided for bit position 2 of any byte having an error indication by check circuit 17 as the bit is being passed through the second Exclusive-OR circuit in the group 15_a_ . . . _n_. Likewise, at the end of the second transmission, the output of block redundancy check circuit 23 indicates whether or not a correction has been obtained by the inversion in the second bit position in any erroneous byte in the block. If a correct data output is signalled by gate 42, the shift register is reset by the output of AND gate 42. On the other hand, if an incorrect data output is indicated by gate 26, its output signals another block retransmission and shifts register 31 to the third assumed position.

Thus, a shift and a retransmission occur after any transmission in which a block redundancy check error is indicated by circuit 23. Ultimately, if the error has not been corrected after every bit position in each byte is assumed to have been the improper bit position, shift register 31 will have shifted to its last position $n+1$ to indicate an uncorrected error situation.

The uncorrected error situation occurs, for example, when errors exist in more than one bit position in the bytes of the block.

In implementing the invention, it is not essential to examine every bit position in a byte during an error correction cycle of operation. For example, the statistical likelihood of an error may be very high in only one or a few bit positions of each byte; and other bit positions may have a very low probability of error. In this case, only the one or few bit positions with high error probability need be available as assumed bit positions during a cycle of the operation of this invention. Hence, the available assumed bit positions in a byte are not necessarily all bit positions in a byte.

In the case where a large number of parallel bits are transmitted simultaneously, this parallel group may be broken into a plurality of bytes, each byte having its own redundancy, such as a parity bit. In such case, a separate vertical redundancy check circuit 17 with separate groups of AND gates 36_a_ . . . _n_ and Exclusive-OR circuits 15_a_ . . . _n_ may be provided for each byte. The bits within such plural bytes for a parallel bit group can, but need not be, mutually exclusive to any one byte. That is, any bit in the parallel group may be assigned to one or plural bytes within the parallel group. In an extreme case, the bits in the parallel group can be assigned to parity groups of the type found within the Hamming code. In the latter case, a bit position in the parallel group is found in plural bytes, and it can be an assumed error position when each of its bytes is utilized by this invention.

A particular application of this invention to magnetic tape is provided in FIGURE 2 wherein a magnetic tape 60 has recorded thereon blocks of data with byte redundancy and block redundancy. The tape is read by a head 61 as it is being moved between reels 63 and 64.

FIGURE 3 shows how a block of data may be recorded on tape 60, which has _n_ number of tracks. FIGURE 3 is prior art of an example of a tape data block with vertical and longitudinal redundancy, and it is merely used for explanatory purposes. This invention goes to the use of the block in FIGURE 3. Track 2 is illustrated as a parity track which contains the byte redundancy. Block check bits provide the block redundancy after the data for the block redundancy. There may be one or more block check bits per tape track. The block redundancy bits may be a conventional longitudinal redundancy check character (LRCC), or a cyclic redundancy check charater (CRCC) as previously explained, or Hamming code check bits (HCCB) for the entire block, as previously mentioned in the specification. A byte in FIGURE 3 is any transverse group of _n_ bits to which one check bit position in parity track –2 is assigned to provide odd or even redundancy.

Tape drive 110 in FIGURE 2 communicates each data block having redundancy with a tape control 111 which acts as the data receiver. The data read from tape transfers over a data bus 116 to the tape control, and data bus 116 comprises a number of lines equal to the number of tracks on tape. The other lines connected between the tape drive 110 and tape control 111 are control lines identified as go-line 131, forward-backward line 132, and read line 134. (Only those control lines within the tape drive and tape control interfaces pertinent to the operation of this invention are shown.) The forward-backward line 132 determines the direction of tape while the go-line 131 controls the tape movement. Tape only moves in response to the go-line signal being up, and stops when the go-line signal is down. The read line 134 causes data bytes from a data block being scanned to be transmitted via data bus 116 to the tape control 111 which detects the data. After detection and byte storage in the tape control, the data is transferred to and stored in a memory of computer 112 by data bus 118.

Conventional tape controls include a vertical redundancy check circuit (VRCC) 117, and a longitudinal check redundancy circuit (LRCC) 223. Furthermore, there are tape controls now being marketed in the United States that contain a cyclic redundancy check circuit (CRCC) 123 in addition to circuits 117 and 223. Furthermore, the Hamming type of check circuit (HCCB) 333 is known in the art for checking all bits in a data block, such as each track of the block having its own group of Hamming check bits.

The control lines to the tape drive are actuated by the tape control in response to signals on control lines from the computer 112. The retransmit signal on line 133 is the same as explained for line 33 in FIGURE 1. The retransmit signal on line 133 is provided from the tape control 111 to the computer 112; and then after monitoring the signal the computer provides the signal back to the tape control, which transfers the signal to the tape drive to begin the retransmission. In relaying of the retransmit control signals, the form of the retransmit control signals is modified in a conventional manner according to monitoring by a computer error-routine subprogram 113. For example, a retransmit signal (as explained for line 33 in FIGURE 1) is provided on retransmit line 133 from the error-correction circuits in the tape control to the computer. The retransmit signal is then monitored by its error-routine subprogram 113 to determine when the next retransmission should occur. In response thereto, the computer signal is modified in form and relayed from the computer to the tape control and then to the tape drive. Thus, the subprogram causes the retransmission by having the tape block reread, which can be done in a number of conventional ways, such as by next reading the block backwards, where the tape drive has read-backward capability, and thereafter alternating the retransmissions between reading the block forward and reading it backward. Where a tape drive does not have read-backward capability, the block is backspaced without reading the data, and then it is transmitted for the second time by reading it again in the forward direction in the same manner as the first transmission, and so on, for other retransmissions.

In the read-backward case, a signal on retransmit line 133 causes the computer subprogram 113 to signal on backspace line 137 and read backward line 138; this causes the tape control to recode these signals on the forward-backward line 132 to indicate the backward direction, on the go-line 131 to signal the tape to move, and on the read line 134 to cause the tape write heads to be disabled while it is read. In response to this operation, a retransmission of the same block of information occurs in the backward direction with the block check bits being read first; and the error-correction circuit operates in the same manner as described for FIGURE 1.

In the case where the drive can only be read forward, the computer 112 is signalled by the retransmit line 133 in the same manner. Then the computer subprogram 113 signals the tape control 111 on backspace line 137 which signals the tape drive on the backward line 132, go-line 131, and read line 134 to disable the write heads. In this case, the tape moves backward by one block without reading any data over the data bus 116. After the block backspace is completed, the computer subprogram 113 activates the read line 139 to the tape control; and then the tape control activates the forward-backward line 132 in the forward direction, the go-line 131 to move tape, and the read line 134. When tape moves in the forward direction, data on bus 116 is recognized by the tape control as the next transmission of the block.

Regardless of the manner of reading the tape, the error-correction operation of this invention described for FIGURE 1 operates in the same fundamental manner. As the data block is being retransmitted through the error-correction circuits, it is being transferred on data bus 118 to the computer memory in which it replaces the previous incorrect transmission of the block. Hence, where more than one transmission is needed, the last correct transmission replaces the prior incorrect transmissions of the block in the computer memory or wherever else the information is received.

The assumption circuit need not be a shift register, but can be any memory device capable of remembering an assumed bit position during a block transmission. The selection of a particular memory device representing an assumed bit position can thus be done in many equivalent ways, such as from a programmed counter for example.

Sampling gates 29*a* . . . *n* eliminate slivers or glitches caused by any delay in operation of circuit 17. The sampling prevents the uncorrected data form to appear as a glitch on any data output line 16*a* . . . *n* before the corrected data output can appear.

Block redundancy herein includes redundancy bits which only pertain to a portion of a block, other than to any byte per se. For example, it includes redundancy pertinent to only a single tape track or channel in a parallel track or parallel channel transmission system.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An error-correcting receiving system for a plurality of data bytes, in which each byte has a byte error checking redundancy, and all of said bytes have a common error checking redundancy, comprising:

means for detecting a byte error using said byte error checking redundancy to provide a byte error signal in response to a detected byte error, means for inverting a selected bit position in each byte in response to said byte error signal to provide an output signal, and means for detecting an error in said output signal using said common error checking redundancy to indicate correction of an error by said inverting means.

2. An error-correcting receiving system for a multibyte block of data having a block-checking redundancy and a byte checking redundancy, comprising:

means for selecting a byte bit assumed to be in error, means for inverting a bit in said assumed bit position in response to an error indication from said byte checking redundancy, and block checking means for checking bits in said assumed bit position including any inverted bit from said inverting means to indicate if any inverted bit is correctly inverted.

3. An error-correcting receiving system as defined in claim 2, further including:

means for signalling a retransmission of said block in response to an error indication by said block checking means, and means for selecting another byte bit position assumed to be in error in response to said retransmission signalling means.

4. An error-correcting receiving system as defined in claim 3, further including:

means cooperating with said bit position selecting means and said block checking means for indicating an uncorrected error condition when said block checking means indicates a discrepancy after every available byte bit-position has been assumed in error during a respective transmission of said block.

5. An error-correcting receiving system as defined in claim 2 in which:
  a vertical redundancy check circuit comprises said byte checking means.

6. An error-correcting receiving system as defined in claim 2 in which:
  a longitudinal redundancy check circuit comprises said block checking means.

7. An error-correcting system as defined in claim 2 in which:
  a cyclic redundancy check circuit comprises said block checking means.

8. An error-correcting receiving system as defined in claim 2 in which:
  a Hamming code check circuit comprises said block checking means.

9. An error-correcting receiving system for a multichannel block of data having a block checking redundancy and a byte checking redundancy, comprising:
  means for transmitting said block of data with at least one of said checking redundancies,
  means for receiving said block of data,
  means for checking said received block of data with said transmitted redundancy for providing an error indication output upon sensing a redundancy discrepancy,
  means for signalling said transmitting means for a retransmission of said block of data with both of said redundancies in response to said error indication output,
  means for assuming that one of said channels contains said error,
  means for inverting each bit in said assumed channel for which a discrepancy is signalled by said byte checking redundancy,
  and means for rechecking said received block after operation of said inverting means with said block checking redundancy to provide an error or no-error indication.

10. A multichannel error-correction system as defined in claim 9, further including:

said assuming means being actuated to select a different channel by said retransmission means for each retransmission of said block with said redundancies,
  means for causing a retransmission of said block with said redundancies after each transmission with a block redundancy error indication.

11. A multichannel error-correction system as defined in claim 10, further including:
  means in said error-correction system for terminating signals to said transmitting means for said retransmission after said assuming means has been actuated to every available channel.

12. An error-correcting system with a receiving means for receiving bytes comprising:
  a byte checking circuit with said receiving means for receiving each of said bytes and providing a byte error status signal,
  an inverting circuit with said receiving means for inverting a selected bit position in each byte for which an error is detected by said byte checking circuit,
  and means with said receiving means for checking a plurality of received bits in said selected bit position after any have been inverted by said inverting means.

References Cited

UNITED STATES PATENTS

| | | | |
|---|---|---|---|
| 2,977,047 | 3/1961 | Bloch | 340—146.1 X |
| 3,075,175 | 1/1963 | Lourie | 340—146.1 |

OTHER REFERENCES

K. Y. Sih: "Single Track Error Correction on Multichannel Tapes," IBM Technical Disclosure Bulletin, vol. 8, No. 3, August 1965.

MALCOLM A. MORRISON, *Primary Examiner.*

C. E. ATKINSON, *Assistant Examiner.*

U.S. Cl. X.R.

235—153; 340—174.1

PO-1050
(5/69)

UNITED STATES PATENT OFFICE
CERTIFICATE OF CORRECTION

Patent No. 3,449,718 Dated June 10, 1969

Inventor(s) Paul W. Woo

It is certified that error appears in the above-identified patent and that said Letters Patent are hereby corrected as shown below:

Column 8, line 18, after the word "29a . . . n", should be inserted --at the outputs of Exclusive-OR circuits 15a . . . n --.

SIGNED AND
SEALED

NOV 4 1969

(SEAL)
Attest:

Edward M. Fletcher, Jr.
Attesting Officer

WILLIAM E. SCHUYLER, JR.
Commissioner of Patents